April 28, 1959  W. P. WEBER  2,884,081
SPRING TOOTH PLOW AND ATTACHMENT
Filed Dec. 16, 1953
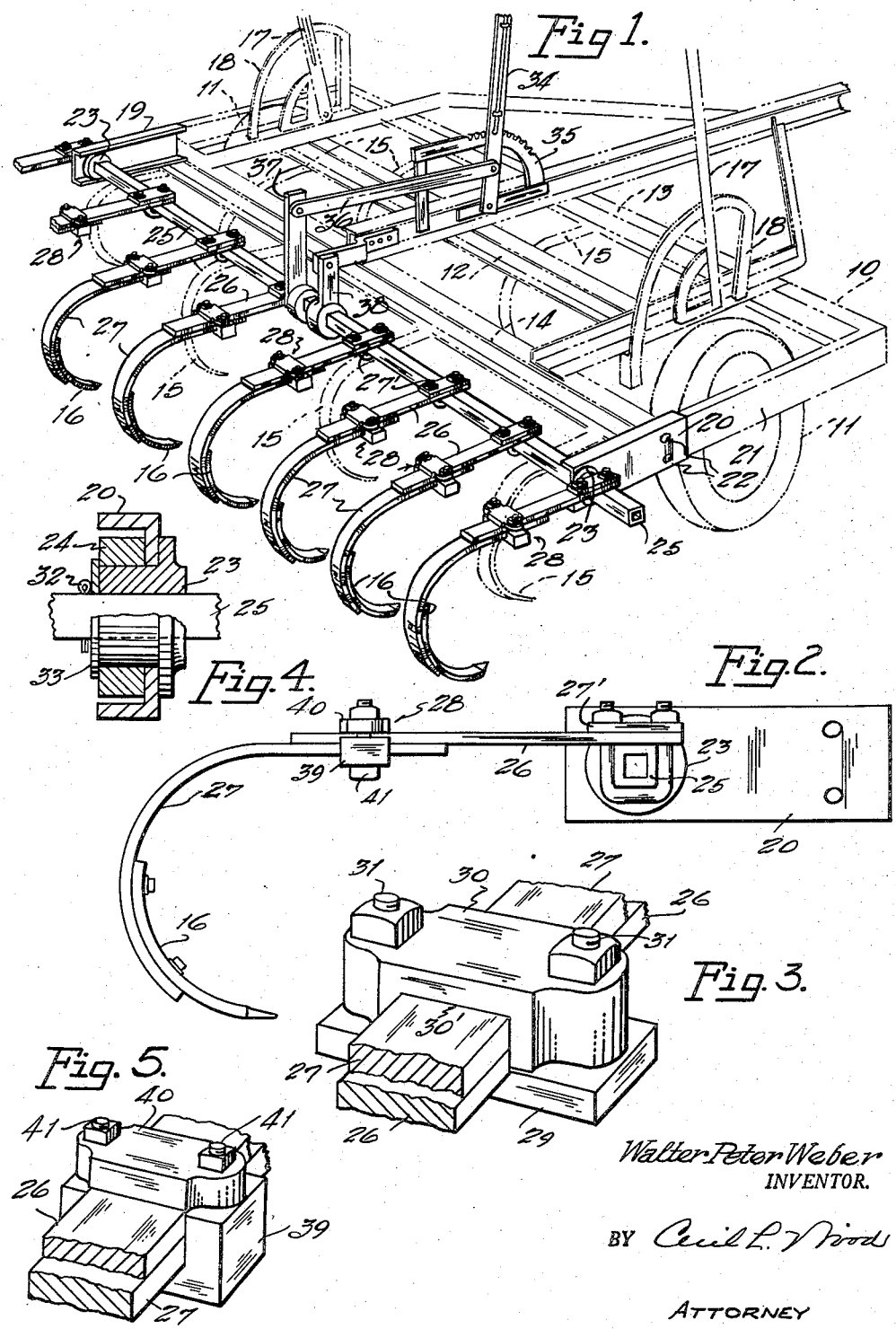
Walter Peter Weber
INVENTOR.
BY
ATTORNEY United States Patent Office 2,884,081
Patented Apr. 28, 1959

2,884,081

SPRING TOOTH PLOW AND ATTACHMENT

Walter Peter Weber, Cordell, Okla.

Application December 16, 1953, Serial No. 398,490

1 Claim. (Cl. 172—482)

This invention relates to agricultural machinery and equipment, and it has particular reference to a soil working tool of the type adapted for attachment to and operated in conjunction with a conventional spring tooth plow commonly designated as a tiller plow or subsoiler, and the principal object of the invention resides in the provision of an implement of simple design and structure having a plurality of soil penetrating members capable of being spaced horizontally to coincide with the spacings between the shanks of the plow to which the device is attached in order to effect a more thorough working of the soil.

Another object of the invention is that of providing a tool by which the soil can be better prepared to receive and retain moisture which generally fails to penetrate the upper portions of the beds usually formed between the furrows resulting from the use of the subsoiler type of plow, having spring shanks and employed more generally in the Great Plains areas where rainfall is usually at a minimum.

The invention is designed to be adjustable both vertically and horizontally whereby the soil engaging elements can be spaced apart, as desired, or arranged for plowing at varying depths according to the particular requirements.

It is an object of the invention to provide special attaching means by which the device can be readily applied to the frame of a conventional plow, and having a drawbar rotatable by a lever assembly by which the invention can be adjusted to enter the soil at different depths or raised to inoperative position, as desired, and affording a manipulating arrangement by which such operations can be accomplished from the operator's seat on a tractor.

Broadly, the invention contemplates the provision of a soil working implement by which maximum benefits can be derived from minimum soil moisture by reducing the spacings between furrows and lessening the depths of the beds while also providing for a maximum of soil disturbance for better cultivation.

While the foregoing objects are paramount, other and lesser objects will become manifest as the description proceeds, taken in connection with the appended drawings wherein:

Figure 1 is a perspective illustration of the invention shown attached to a conventional plow, the latter being shown in broken lines, and illustrating the arrangement of adjustable shanks.

Figure 2 is a side elevational view of one of the supporting brackets and one end of the polygonal toolbar and showing one of the adjustable curved shanks.

Figure 3 fragmentarily illustrates, in perspective, one of the shank brackets and a shank attached thereto by a shank clamp.

Figure 4 is a transverse sectional view through one of the supporting brackets showing the toolbar bearing therein in partial section and fragmentarily illustrating the toolbar in the bearing, and Figure 5 is a perspective view of a modified form of clamp for securing the shanks to the supporting brackets.

The invention is designed for attachment to a plow of conventional structure, as illustrated in Figure 1 in broken lines, which has a frame 10 of channel members supported by wheels 11 at each end. The frame 10 is rectangular and has a central bar 12 arranged intermediate the front and rear channel members 13 and 14, and each of these have tool shanks 15 attached thereto which are curved and adapted to have different types of soil engaging tools such as a chisel 16, shown in Figure 2, or one of several designs of sweeps, and other bottoms not shown. The conventional plow is equipped with levers 17 and segments 18 for adjusting the bottoms and raising the same for transportation.

The invention comprises a pair of supporting channel brackets 19 and 20 which are adapted to fit over the end bars 21 of the plow frame 10 and extend rearwardly therefrom, being secured thereto by bolts 22, as illustrated in Figure 1. In the outer ends of the channel brackets 19 and 20 are bearings 23 which are rotatable in integral sleeves 24 extending inwardly from the members 19 and 20, as shown in Figure 4. The bearings 23 have square passages therethrough to conform to a polygonal toolbar 25 which extends between the brackets 19 and 20 rearwardly from and parallel to the rearmost channel member 14 of the frame 10, as illustrated in Figure 1.

Spaced along the toolbar 25 are a plurality of shank brackets 26 secured by clamps 27' which can be adjusted to different spacings, as desired, according to the required operations and depending upon the spacings of the shanks 15 of the implement to which the invention is attached. The brackets 26 extend rearwardly from the toolbar 25 and are preferably formed of flat bars. To each of the brackets 26 is adjustably secured a spring type curved plow shank 27 to the bottom of which can be attached any of several types of tools, such as the chisel 16 shown in Figure 2, or any of the standard sweeps or knives common to the type of shanks described.

The shanks 27 are adjustably secured to the brackets 26 by clamps 28, as hereinafter described, whereby a sliding adjustment between the shanks 27 and the brackets 26 can be accomplished. The shanks 27 can be adjusted in an arc to change the incidence of the ground engaging tool 16 with respect to the earth.

The clamps 28 may be constructed as shown in Fig. 3, or alternatively, as shown in Figs. 1, 2, and 5. As shown in Fig. 3, the clamps 28 consist of plates 29 and opposing castings 30, each of which is formed with a recess 30' conformable to the brackets 26 and the shanks 27, and secured to the plates 29 by bolts 31. The shanks 27 and the brackets 26 are clamped between the plates 29 and the castings 30. As shown in Figs. 1, 2, and 5, the bottom portion 39 is U-shaped to embrace the brackets 26 and shanks 27, a plate 40 being secured to the member 39 by bolts 41.

The toolbar 25 is retained in the bearings 23 by pins 32 and washers 33 and is rotated through the medium of a lever 34 operating on a segment 35 bolted to the plow frame 10 and having a series of notches thereon whereby different lever settings can be accomplished. The lever 34 is connected by a link 36 to an arm 37 secured to and extending from the top of the toolbar 25, the latter being supported intermediate its ends by a bracket 38 attached to the rear channel member 12 of the plow frame 10.

The invention, therefore, can be adjusted independently of the plow to which it is attached and caused to engage the soil to operate shallow or deep as desired. The spacings of the shanks 27 are made to conform to the spacings of the shanks 15 of the carrier plow which are generally set as to spacings to form relatively narrow ridges or beds between their furrows, it being the purpose of the shanks 27 to part the beds to effect a greater degree of soil disturbance and provide for the retention of moisture therein.

The attachment which embodies the invention will process the soil much in the same manner as in the use of a spring tooth harrow following a breaking plow. The type of conventional implement illustrated in Figure 1 is employed more extensively in the flat Plains areas as a subsoiler and often replaces a disk or moldboard breaking plow, and the use of the attachment exemplified in the invention will leave the surface of the soil level and with a minimum of peaks and recessions transverse to the plowing operations and provide for a more uniform moisture penetration.

Manifestly, the structure herein shown and described is capable of certain changes and modifications, by persons skilled in the art, without departing from the spirit and intent of the invention or the scope of the appended claim.

What is claimed is:

In combination with a spring tooth plow having a rigid, horizontally disposed rectangular frame, a pair of wheels supporting the frame at its sides, two rows of spring teeth arranged transversely relative to the frame and positioned forwardly and rearwardly, respectively, relative thereto, and a third row of spring teeth arranged parallel to and between said two rows, the spring teeth of said rows being staggered relative to each other, the spring teeth each comprising a curved spring type plow shank rigidly connected to the frame and extending rearwardly, downwardly and forwardly relative thereto, and a cutting blade rigidly connected to the lower end of the shank and extending downwardly and forwardly therefrom, a rearward extension of the plow comprising a pair of brackets rigidly connected to the sides of the frame and extending rearwardly therefrom, a polygonal tool bar arranged transversely relative to the frame and having its ends journaled in bearings provided therefor in the brackets, a plurality of shank brackets each consisting of a flat bar removably and adjustably connected at one end to the tool bar and extending rearwardly therefrom, the shank brackets being adjustable longitudinally relative to the tool bar, a plurality of spring teeth each having its shank removably and adjustably connected to one of the shank brackets and adjustable longitudinally relative thereto, the last mentioned spring teeth being staggered relative to the first mentioned spring teeth, a bar rigidly connected to the tool bar and extending upwardly therefrom, a lever pivotally connected at one end to the frame and extending upwardly therefrom, ratchet means rigidly connected to the frame and acting on the lever to maintain the lever in selected rotative position relative to its pivot, and linkage connecting the lever to the last mentioned bar whereby the tool bar may be rotated about its axis by manipulation of the lever.

References Cited in the file of this patent

UNITED STATES PATENTS

| 413,836 | Sylvester | Oct. 29, 1889 |
|---|---|---|
| 1,058,470 | Salget | Apr. 8, 1913 |
| 1,159,660 | Gaume | Nov. 9, 1915 |
| 1,354,665 | Knuppel | Oct. 5, 1920 |
| 1,910,109 | Klinkhammer et al. | May 23, 1933 |
| 2,180,910 | Reynolds | Nov. 21, 1939 |
| 2,256,140 | Dalimata | Sept. 16, 1941 |
| 2,588,918 | Graham | Mar. 11, 1952 |
| 2,679,793 | Rolf et al. | June 1, 1954 |

FOREIGN PATENTS

| 570,933 | France | Jan. 23, 1924 |